Nov. 13, 1928.
L. W. MELCHER
MOTOR DRIVEN VEHICLE
Filed March 5, 1923    4 Sheets-Sheet 1
1,691,579
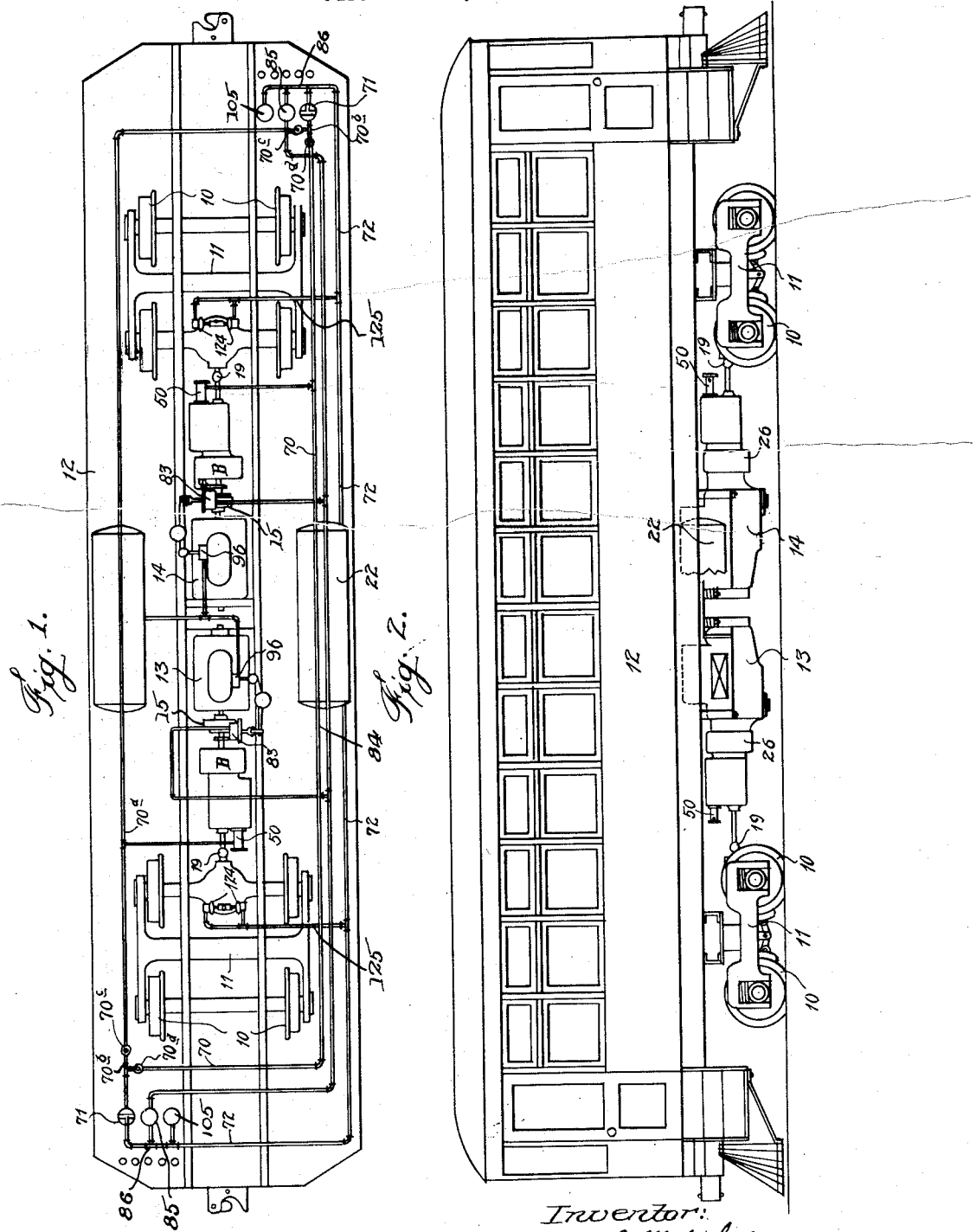

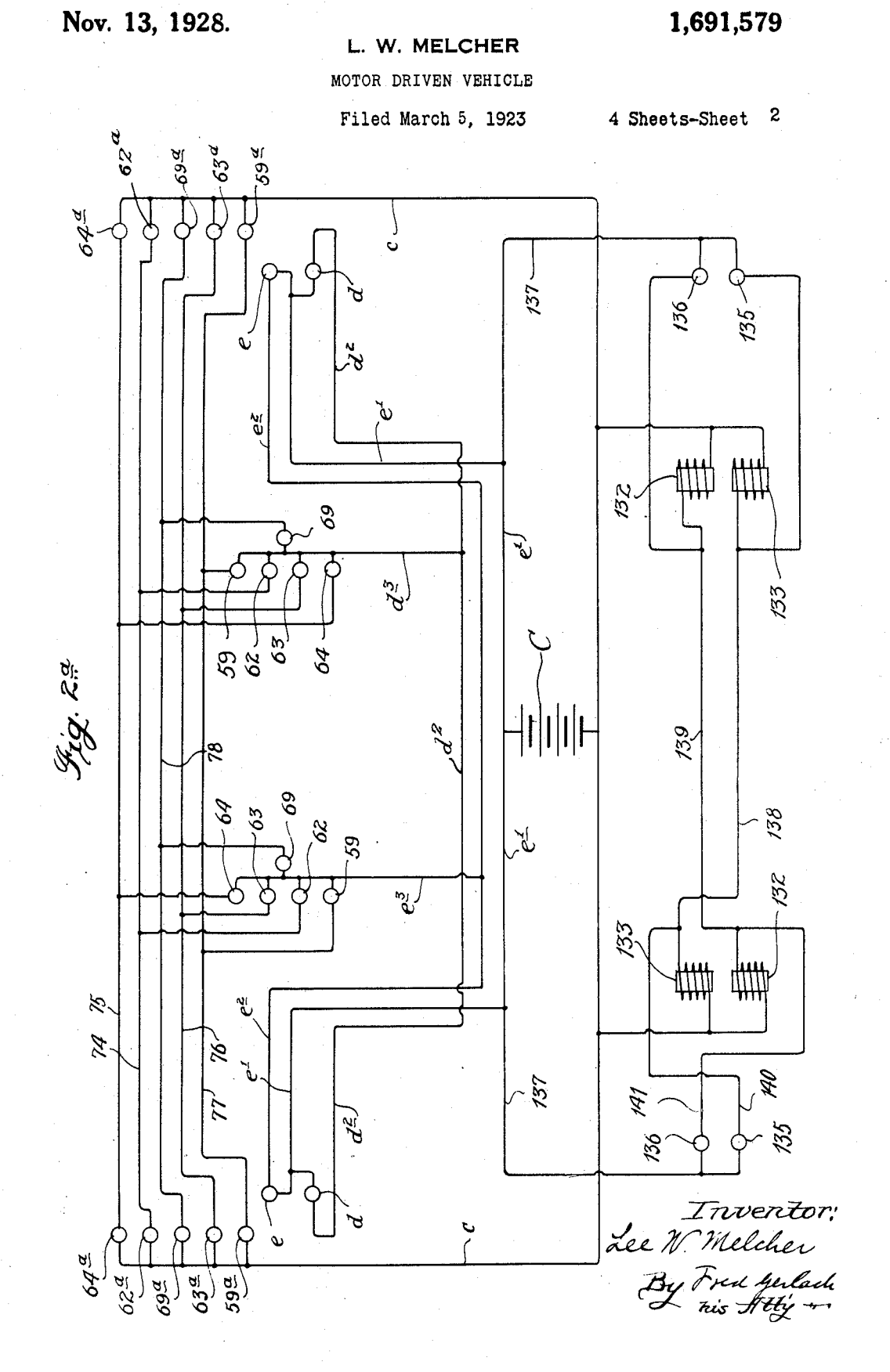

Nov. 13, 1928.  1,691,579
L. W. MELCHER
MOTOR DRIVEN VEHICLE
Filed March 5, 1923  4 Sheets-Sheet 3
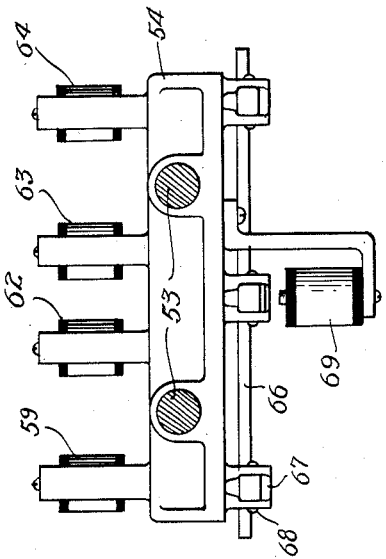
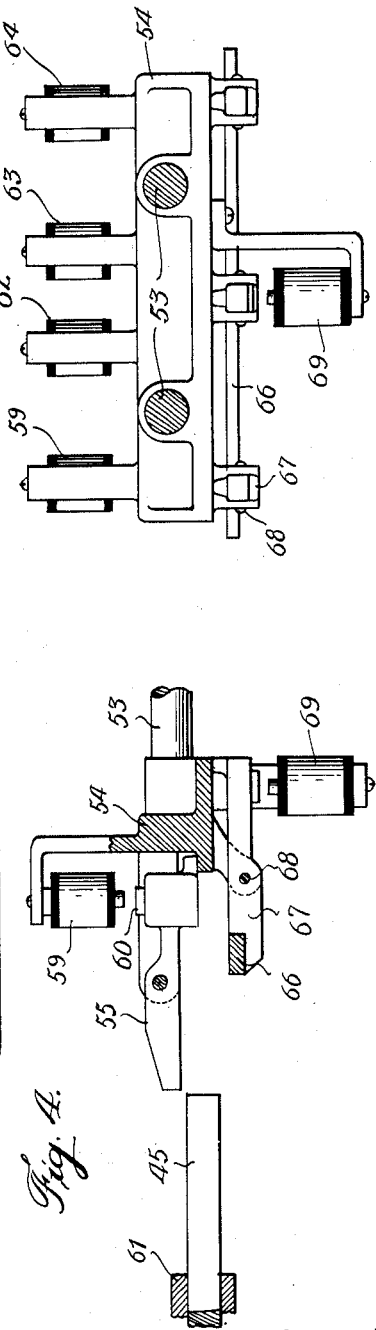
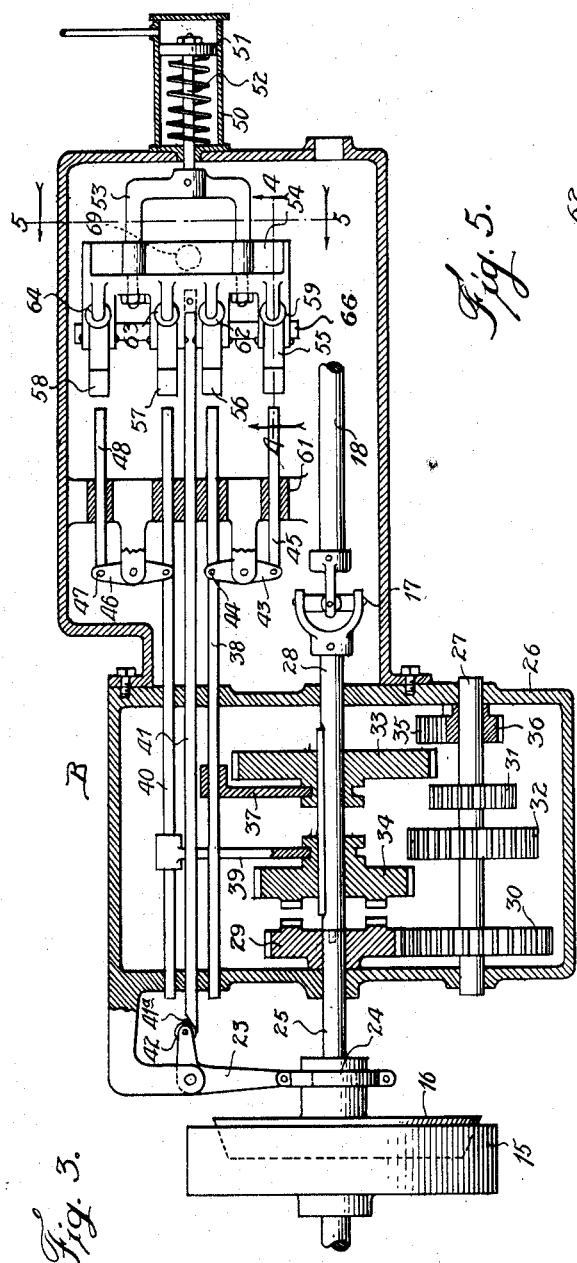
Inventor:
Lee W. Melcher
By Fred Gerlach
his Atty Nov. 13, 1928.
L. W. MELCHER
1,691,579
MOTOR DRIVEN VEHICLE
Filed March 5, 1923     4 Sheets-Sheet 4
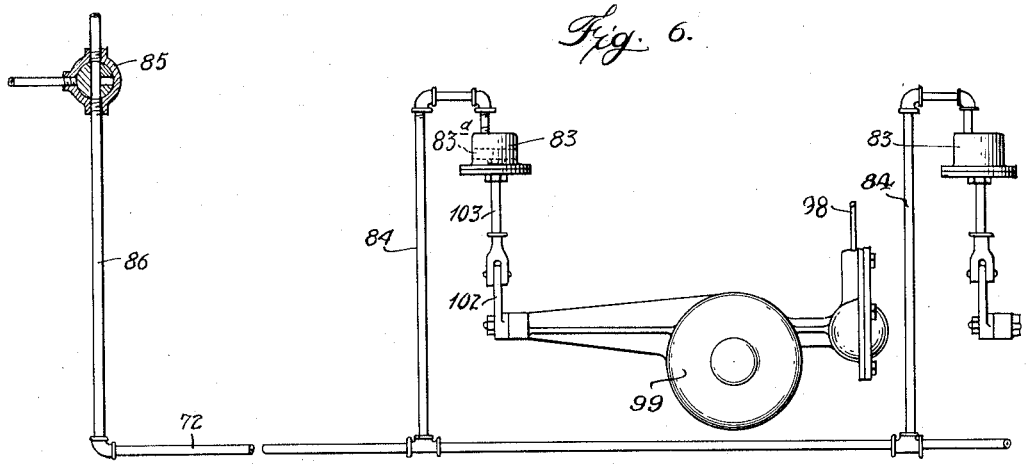
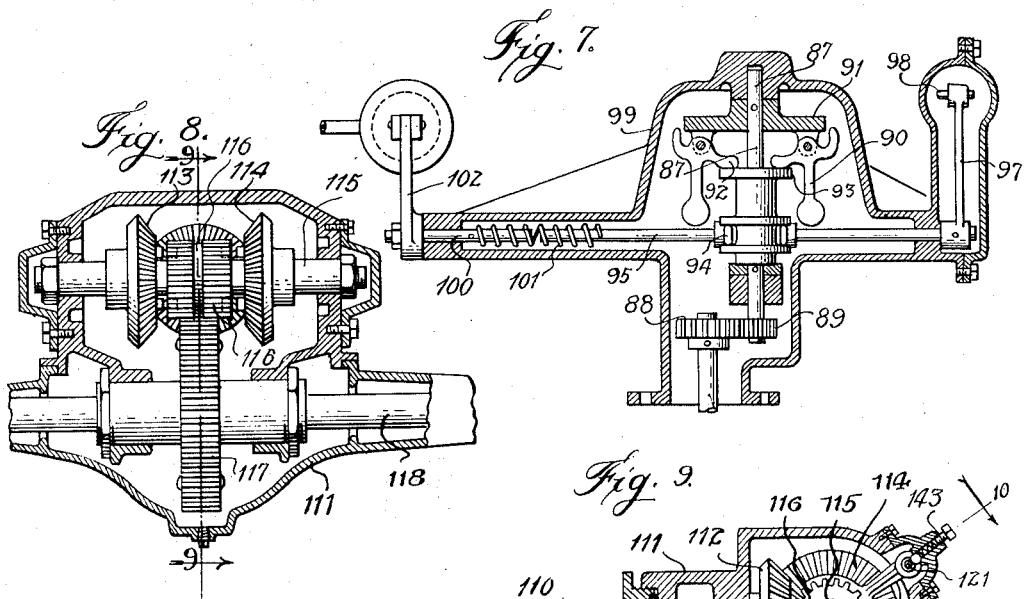
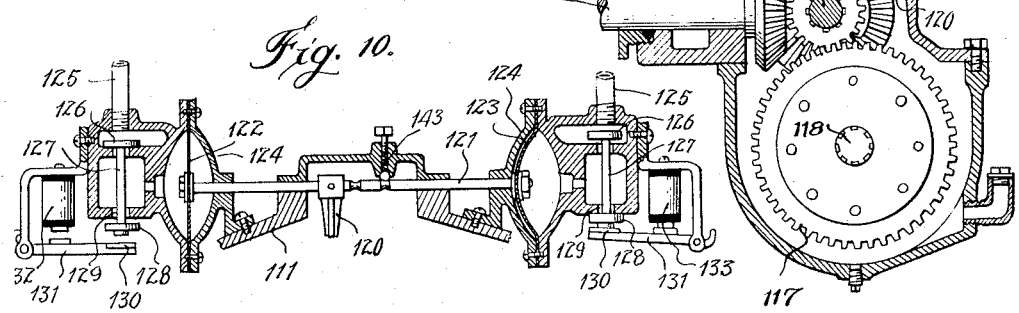
Inventor:
Lee W. Melcher
By Fred Gerlach
his Atty Patented Nov. 13, 1928.

1,691,579

UNITED STATES PATENT OFFICE.

LEE W. MELCHER, OF WEST DE PERE, WISCONSIN, ASSIGNOR TO RAILWAY MOTORS CORPORATION, OF DE PERE, WISCONSIN, A CORPORATION OF WISCONSIN.

MOTOR-DRIVEN VEHICLE.

Application filed March 5, 1923. Serial No. 622,751.

The invention relates to cars or trucks propelled by internal combustion motors and more particularly to mechanism for controlling the operation thereof.

One object of the invention is to provide a vehicle, such as a car or truck, with a plurality of internal combustion motors so that there will be ample reserve power for starting, heavy grades and emergency loads, with controlling mechanism which makes it possible to operate the motors separately or conjointly so that, for purposes of economy, the reserve motor can be put out of use when the vehicle is under headway or has attained such speed that the reserve power is no longer necessary. Another object of the invention is to provide controlling mechanism for a vehicle propelled in this manner, in which compressed air is used as the motive agent for shifting the various parts of the controlling mechanism and electrically controlled devices are used to control the operation of the parts by the compressed air mechanism. Another object of the invention is to provide controlling mechanism for a vehicle of this character which is of a construction which permits the power plant to be controlled from either end of a car. Other objects of the invention will appear from the detailed description.

The invention consists in the several novel features hereinafter set forth and more particularly defined by the claims at the conclusion hereof.

In the drawings: Fig. 1 is a diagrammatic plan of a car embodying the invention. Fig. 2 is a side elevation. Fig. 2ª is a diagram of the electrical circuits of the controlling mechanism. Fig. 3 is a sectional view of the variable speed and reversible transmission gearing between one of the motors and one of the axles and the air pressure mechanism for shifting the gearing under electromagnetic control. Fig. 4 is an enlarged section taken on line 4—4 of Fig. 3. Fig. 5 is an enlarged section taken on line 5—5 of Fig. 3. Fig. 6 is a plan of the speed controlling mechanism for the motors. Fig 7 is a section of the speed governor for one of the motors. Fig. 8 is a section through the gearing on one of the driven axles. Fig. 9 is a section taken on line 9—9 of Fig. 8. Fig. 10 is a section taken on line 10—10 of Fig. 9.

The invention is exemplified in connection with a railway car comprising wheels 10 adapted to run on tracks, trucks 11 and a body 12, which may be of any suitable construction, as well understood in the art. The power plant for propelling the cars comprises a pair of independent internal combustion motors 13 and 14, each connected to drive a pair of traction wheels at the opposite ends of the truck respectively. Each motor is of the multi-cylinder type, may be of usual construction and is suitably mounted under the body of the car. Each motor is connected to drive one pair of wheels 10 through a clutch comprising a drive-member 15 connected to the motor and a driven member 16 connected to drive a variable speed and reversible transmission gear B, which is connected to drive a universal joint 17, which drives a universal shaft 18 to drive a second universal joint 19, which is connected to drive reversible gearing of suitable construction in a gear-case 111 around a traction-wheel axle. The purpose in providing a plurality of independent motors for separately driving the traction wheels is to make it possible to cumulate their power in starting or at any time when the use of reserve power is necessary and to permit the entire car to be driven by one motor when it has acquired sufficient speed to render the use of more unnecessary and uneconomical.

In the operation of independent internal combustion motors, it is necessary to synchronize their controls, so that their power may be properly cumulated and controlled by the operator. The present invention contemplates the use of compressed air for effecting the movement of the parts that are required to be synchronously or individually shifted, and, for this purpose, a reservoir 22 is provided, which is connected to receive air from a compressor (not shown) operated by one or more of the motors, so that there will be maintained therein a substantially uniform pressure of air. The air from this reservoir is used to control the speed by varying the fuel supply as hereinafter more fully set forth and also to furnish the power for synchronously effecting the various gear-shifting elements.

Each driven clutch-member 16 is operable into and out of driving relation with member 15 by a bell-crank lever 23 which is pivoted so it will shift a collar 24 in a groove in the hub of driven member 16. The driven member of the clutch is slidable on and adapted to drive a shaft 25. Each transmission-gearing comprises a case 26 containing a countershaft 27. The shaft 28 of the driving member of a universal joint 17 is also extended into the case and is coaxial with shaft 25. A gear 29 fixed on the inner end of shaft 25 meshes constantly with a gear 30 which is fixed on and drives the countershaft 27. A low-speed pinion 31 and an intermediate or second speed pinion 32 are fixed to countershaft 27. A gear 33, slidably mounted on shaft 28, is adapted to be shifted into engagement with pinion 31 to drive shaft 28 at low speed in forward direction. A gear 34, which is slidably mounted on and adapted to drive shaft 28, is shiftable into engagement with gear 32 to drive the car at intermediate speed and also into direct driving connection with the gear 29 to propel the car at high speed. Gear 33 is also adapted to be shifted into engagement with a reverse pinion 35 which is driven by a pinion 36 on the countershaft 24. Gear 33 is shiftable by a fork 37 which is fixed to a bar 38 which is slidably mounted in the gear-case 26. Gear 34 is shiftable by a fork 39 which is fixed to a bar 40 which is slidable longitudinally in the gear-case 26. A rod 41, which is also slidable through the gear-case, is provided with an inclined end 41ᵃ to engage a roller 42 on one arm of the bell-crank lever 23 to disengage clutch-member 16 from member 15. Normally, gears 33, 34 are in neutral position. By shifting gear 33 in one direction, it will mesh with the low speed pinion 31 and by shift in the opposite direction, it will mesh with the reverse pinion 35. By shift of gear 34 in one direction, it will mesh with intermediate speed pinion 32 and, by shift in the opposite direction, it will be drivably connected to the gear 29 on shaft 25. Bars 38 and 40 are shifted in one direction by dogs acting directly on their ends respectively. To shift bar 38 in the opposite direction, a centrally fulcrumed lever 43 is pivoted at one of its ends to said bar at 44 and has its other end pivoted to a slidable bar 45 which moves reversely to bar 38, through said lever. A similar centrally pivoted lever 46 has one of its ends pivoted to bar 40 and its other end pivoted, as at 47, to a slidable bar 48.

The mechanism for operating each set of these gear-shift bars 45, 38, 40, 48 comprises a cylinder 50, a piston 51 slidable therein, a piston rod 52 fixed to the piston and extending to the outside of the cylinder, a yoke 53 fixed to said rod, a cross-head 54 fixed to said yoke and a series of four dogs 55, 56, 57 and 58, each pivoted to the cross-head and extended to engage the end of one of the gear-shift rods. These dogs are pivoted so they may be selectively shifted into position to operate one of the rods by electro-magnets 59, 62, 63 and 64 respectively. These electro-magnets are mounted on cross-head 54. Each dog is normally positioned to clear its associated gear-shift rod and carries an armature 60 which is adapted to be attracted by the core of a magnet when it helix is energized, to lift the tail of the dog and cause its front end to be lowered into position to engage one of the gear-shift rods when the yoke 53 and head 54 are operated by the admission of air under pressure to the cylinder 50. A bearing 61 is provided for each of the gear-shift rods. Magnets 59, 62, 63 and 64 are separately controlled so that the operator can selectively cause them to be energized according to the gear-change desired.

A cross-bar 66, rigid with and fixed to arms 67, is pivotally connected at 68 to the cross-head 54. This cross-bar 66 is adapted to be shifted by a magnet 69 into position to engage all of the gear-shift bars to reset them in their normal or neutral position when the cross-head is operated for this purpose. Normally, bar 66 is positioned to pass under the gear-shift bars but when magnet 69 is energized, it will be raised to engage the rear ends of such of the gear-shift bars which have been shifted toward the cross-head and when the piston 51 and the cross head 54 are operated, such bars will be shifted to their normal position, causing the other bars to be reversely shifted to their normal positions through levers 43, 46. Bar 41 is rigidly secured to reciprocate with cross-head 54 and consequently, during the initial outward shift of the cross-head, the inclined end 41ᵃ of said bar will lift roller 42 and disconnect the clutch 15, 16. After its initial movement, bar 41 will pass under roller 42 and cause the clutch to remain inoperative until the selected gear-shift rod has been set and the cross-rod is retracted. At the end of the retractile stroke, lever 23 will be released to permit the clutch to become operative.

A cylinder 50 is provided for each transmission gearing. These cylinders are respectively connected to pipes 70, 70ᵃ. A pipe 72 delivers air under pressure from reservoir 22 to the casings of three-way valves 71, one of which is located at each control station, there being one of said stations at either end of the car. The plug of each three-way valve 71 is adapted to deliver air under pressure from pipe 72 to a pipe 70ᵇ. Each pipe 70$^b$ is connected to both pipes 70, 70$^a$ to deliver air into cylinders 50 to operate the gear-shift mechanisms. Each valve 71 is also adapted in one of its positions to cut off the supply of air from pipe 72 and open pipe 70 to atmosphere to exhaust the air from cylinder 50. At each end, pipes 70, 70$^a$ are provided with valves 70$^c$, 70$^d$, so that any of the cylinders 50 may be cut off from pipes 70$^b$, at either control station. This construction makes it possible, by the manipulation of valves 70$^c$ to render either of the cylinders inoperative from either control station, when either motor is idle. Normally, the valve 71 at the idle station is kept closed.

The helix of magnet 62, which controls the dog for the low speed gear-shift, is electrically connected to a conductor 74 which is connected to a switch 62$^a$ at each control station. Magnet 64, for controlling the dog for the intermediate gear-shift, is connected to a conductor 75 which is connected to a switch 64$^a$ at each control station. Magnet 63, which controls the dog for the high speed gear-shift, is connected to a conductor 76 which is connected to a switch 63$^a$ at each control station. Magnet 59, for controlling the dog for the reverse gear-shift, is connected to a conductor 77 which is connected to a switch 59$^a$ at each control station. Magnet 69, for restoring the gear-shift mechanism into neutral or normal position, is connected to a conductor 78 which is connected to a switch 69$^a$ at each control station. The electro-magnets 59, 62, 63, 64 for each transmission gearing are connected to the switches at the control stations, so that all of the corresponding magnets may be controlled from the switches at either station. Connections are provided to render the electro-magnets for either of the transmission gearings operative and inoperative from either of the control stations and, for this purpose, two switches $d$ and $e$ are provided at each control station. The battery C is connected to each of the switches $e$ by a conductor $e'$. A conductor $d^2$, extending between switches $d$, is connected by a conductor $d^3$ to all of the magnets of one transmission gearing and a conductor $e^2$ between switches $e$ is connected by a conductor $e^3$ to all of the magnets for the other transmission gearing. The other side of the battery C is connected by a conductor $c$ to all of the switches 59$^a$, 62$^a$, 63$^a$, 64$^a$ and 69$^a$ at both control stations.

The operation of the controlling mechanism for the variable speed gearing will be as follows: Assuming the motors to be in operation and the gearings in their neutral positions, the operator will close the switch 62$^a$ at whichever control station is in use, thus causing the following circuit to be established; battery C, conductor $e'$, switches $d$ and $e$ at the control station in use, conductors $e^2$ and $d^2$, conductors $e^3$, $d^3$, magnets 62, conductor 74, switch 62$^a$ at the control station and conductors $c$. This will cause magnets 62 to become energized so they will shift dogs 56 to render them operative to shift rods 38. Next, the operator will manipulate the three-way valve 71 at the control station in use to deliver air under pressure from pipe 72 to pipes 70$^b$ and pipes 70, 70$^a$ into both of the cylinders 50. This will operate the pistons 51 to shift the cross-heads 54 outwardly and during their initial shift, rods 41 will disconnect clutches 15, 16 and thereafter dogs 56 will shift rods 38 to bring the gears 33 into position to be driven by pinions 31, so that shafts 28 will be driven at low speed. After the pistons 51 have been operated outwardly, the operator will manipulate valve 71 to exhaust air from cylinders 50 and, thereupon, the clutch rod 41 will be withdrawn to automatically permit the clutch to become operative. By similar cycles of operations, the operator can control the dogs 58, 57 and 55 through switches 64$^a$, 63$^a$ and 59$^a$ respectively. Whenever the operator desires to set the transmissions into neutral positions, he will operate a switch 69$^a$ which will close a circuit to magnet 69 to operate cross-bar 66 into the plane of the gear-shift rods and then manipulate a valve 71 to cause the cross-head 54 to operate said cross-bar and restore all of the gear-shift rods which are out of their normal positions to their neutral positions.

When one of the motors is idle, it is desirable that the gear-shifting mechanism should be rendered inoperative and this can be done by opening either of the switches $e$, $d$, at either of the control stations. When either of said switches is open, the circuits for the operation of the set of magnets to which it is connected will be cut out of the circuits controlled by the switches 64$^a$, 62$^a$, 69$^a$, 63$^a$ and 59$^a$. By closing valve 70$^c$, 70$^d$, either of the cylinders 50 may be inoperative responsively to the valves 71 so that the cross-head for the corresponding transmission will be rendered inoperative.

In the operation of railway cars, it is desirable to operate the car at first, second and third speeds in either direction in order to avoid the necessity of turning the car around. For this purpose, the gearing for each driven axle is provided with reversing mechanism under the control of the operator at either control station. The driven member of each universal joint 19 is secured to a shaft 110 which is suitably mounted in the gear and axle case 111, and a pinion 112 in the case is fixed to said shaft. Oppositely facing pinions 113 and 114 mesh with pinion 112 and are driven in opposite directions thereby. These pinions are rotatably mounted on a shaft 115 which is rotatably mounted in gear-case 111. A clutch-collar 116 slidable on shaft 115, and adapted for driving engagement with either of the pinions 113, 114, meshes with a gear 117 to which the axle sections 118 for the traction-wheels 10 are connected. When clutch collar 116 is in engagement with pinion 113, the traction-wheels will be driven in one direction and when the collar is in engagement with pinion 114, it will drive the traction wheels in the opposite direction.

This mechanism exemplifies reversing gearing which is adapted to be driven from the variable speed transmission gearing so that the car may be propelled in either direction at high speed.

A fork 120 on a transversely slidable shaft 121 is connected to a groove in collar 116 to shift it between pinions 113, 114. Fluid pressure mechanism controllable from control stations at either end of the car is provided to shift the fork 120 and electro-magnetic controlled valves also controllable from the control stations are provided to control the operation of said fluid pressure mechanism. For this purpose, the ends of shaft 121 are respectively secured to diaphragms 122, 123, each of which is secured in a suitable casing 124 which is supported in any suitable manner from gear-casing 111. Air under pressure from reservoir 22 is conducted to the casings 124 by pipes 125. Valves 126 in the casings respectively are adapted to control the supply of air under pressure to the outer side of the diaphragms 122 and 123 respectively. The stems 127 of the valves 126 are extended to the outside of the casings 124 and are each provided with a valve 128 to close a leak-port 129 which permits the escape of air from the casing when valve 126 is closed. The valves 128 are closed while valves 126 are open. Hammers 130 on arms 131 respectively are adapted to be operated by electro-magnets 132, 133 respectively, one of which is secured to each casing 124. When one of the magnets is energized, it will operate its arm 131 and hammer 130 to open valve 126 and close valve 128. This will cause air under pressure to enter that casing to force the diaphragm therein inwardly and shift shaft 121 and arm 120. When the magnet is deenergized, the air pressure will automatically close valve 126 and cut off the supply of air to the diaphragm and simultaneously open the leak port 129 to permit the air under pressure to escape from the casing. These magnets for controlling the reversible axle gearing are controlled by switches 135 and 136, a pair of which is provided in each control station. Each pair of switches is connected by conductor 137 to battery C. Magnets 133 are included in a conductor 138 which is looped between conductors $c$ and magnets 132 are included in a loop conductor 139 which is also connected to conductor $c$.

A conductor 140 leads from each switch 135 to each conductor 138 and a conductor 141 leads from each switch 136 to each conductor 139.

The operation of the electro-magnetic controlling means for the axle reversing gearing will be as follows: When the operator desires to effect a reversal of this gearing, he will close one of the switches 135, 136 to establish a circuit for energizing the magnets which will effect the desired shift of the clutch-collars 116. For example, when the operator closes the switch 135 at one of the control stations, a circuit will be established as follows: battery C, conductors $e'$, 137, switch 135, conductors 140, 138 through both magnets 133 and conductors $c$. Such a circuit may be established by closing the switch 135 at either control station. To reversely shift the clutch-collars 116, the operator will close either of the switches 136 which will establish a circuit through said switch, conductor 141 and both magnets 132. Upon the operation of either of the pairs of controlling magnets, the corresponding valves 126 will be opened to deliver air under pressure to the corresponding diaphragms to shift shaft 121. When any of these switches is closed, valves 126 controlled thereby will automatically close and permit the gearing to remain in its shifted position. If desired, a spring pin 143 may be used to yieldingly lock the shaft 121 in its alternative positions.

This mechanism exemplifies controlling means for variable speed transmission gearings and the gearings associated with the drive-axles, in which compressed air or a fluid under pressure is used as the motive agent for effecting the gear-shift and electro-magnets under selective control of the operator are used to control the operation of the gear-shifting elements. It also exemplifies mechanism for this purpose which readily adapts itself to the synchronous operation of a plurality of transmission gearings either from one or more controlling stations, as well as their individual operations when a motor is idle.

The mechanism for controlling the carburetor throttles for the motors comprises a cylinder 83 for each motor. Each cylinder 83 is connected to a pipe 84 which is connected to valves 85, one at each control station. These are three-way valves and are adapted to control the delivery of air from a pipe 86 which is connected by pipe 72 to the reservoir 22, to deliver air into cylinders 83 and to exhaust air therefrom to atmosphere. Each motor is provided with a governor for automatically controlling the throttle on the carburetor, and each governor is connected to a piston 83$^a$ in one of the cylinders 83 so as to be controllable by the operator at any of the control stations. Each governor comprises a shaft 87 which is connected to be driven from the crankshaft of a motor by suitable gearing 88, 89; a pair of weighted arms 90 pivoted to a disk 91 which is fixed to rotate with shaft 87; abutments 92 on the weighted arms to engage a sleeve 93 which is slidable on shaft 87 to operate an arm 94 on a shaft 95 which is connected to control the throttle of the carburetor 96 of any suitable construction, by an arm 97 and a link 98. Each governor mechanism, including its shafts 95, is mounted in a suitable casing 99. Each connection between a governor and a piston 83ª in cylinder 83 comprises a shaft 100 which is coaxial with shaft 95 and is connected thereto by a coil-spring 101; an arm 102 fixed to shaft 100; and a connecting rod 103 between said arm and piston 83ª. Normally, each throttle is wide open. As the speed of its motor increases, the weighted arms 90 will be thrown outwardly by centrifugal force and operate sleeve 93 to rock shaft 95. This will cause the throttle to be progressively closed as the speed of the motor increases. Spring 101 permits shaft 95 to be operated by the governor independently of piston 83ª. When air under pressure is admitted to cylinder 83, it will operate piston 83ª to rock shaft 100 which will, through spring 101, increase the resistance to the centrifugal force of arms 90. As a result, the speed of the motor can be controlled by the compressed air in cylinder 83.

The operation of each speed controlling mechanism will be as follows: Assuming the motor to be running, valve 85, which is of the three-way type, will be set so as to exhaust air from cylinders 83, at which time the motor will be under normal control by the governor which will operate to reduce the throttle opening as the speed of the car increases. When it is desired to increase the speed of the car, the operator will manipulate a valve 85 at either control station to cause air under pressure from reservoir 22 to be delivered into the cylinders 83. This will cause the force of springs 101 in the governors to be increased to restrict the action of the centrifugal governor arms and cause a larger throttle opening to be maintained and so that the motor will have sufficient fuel to operate at the higher speed desired.

Air from reservoir 22 may also be utilized to control air-brakes of usual construction through a suitable control valve 105, to which air is supplied through a continuation of pipe 86 which leads from reservoir 22. The air-brake may be of any suitable construction.

The invention exemplifies speed controlling mechanism for internal combustion motors which is operable by fluid under pressure under control of a valve at any one of several control stations.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a motor propelled vehicle, the combination of a plurality of motors, traction-wheels, mechanism for driving the traction-wheels from the motors comprising variable speed transmission gearings driven by said motors respectively, and controlling mechanisms for said gearings whereby they may be conjointly or individually operated, comprising electro-magnets and switches for controlling said magnets.

2. In a motor propelled vehicle, the combination of a plurality of motors, traction-wheels, variable speed transmission gearings driven by said motors respectively, and controlling mechanism for said gearings comprising gear-shifting elements for said gearings respectively, and means operable by fluid under pressure whereby the corresponding elements of the gearings may be conjointly or individually shifted.

3. In a motor propelled vehicle, the combination of a plurality of motors, traction-wheels, variable speed transmission gearings driven by said motors respectively, and controlling mechanism for said gearings comprising gear-shifting elements for said gearings respectively, means operable by fluid under pressure whereby the corresponding elements of the gearings may be conjointly or individually shifted and electro-magnetic means for selectively controlling the shift of said elements by said shifting means.

4. In a motor propelled vehicle, the combination of a motor, traction-wheels, mechanism for driving said wheels from the motor comprising variable-speed transmission-gearing, gear-shifting elements for controlling said gearing, and means operable by fluid under pressure for selectively shifting said elements from control stations at either end of the vehicle.

5. In a motor propelled vehicle, the combination of a motor, traction-wheels, mechanism for driving said wheels from the motor comprising variable-speed transmission-gearing, gear-shifting elements for controlling said gearing, means operable by fluid under pressure for selectively shifting said elements from control stations at either end of the vehicle, and electro-magnetic means for controlling the shifting means from either control station.

6. In a motor propelled vehicle, the combination of a plurality of motors, traction-wheels, variable speed transmission-gearings driven by said motors respectively, gear-shifting elements for controlling said gearings respectively, and means operable from control stations at either end of the car for conjointly or individually shifting the corresponding shifting elements for the gearings respectively.

7. In a motor propelled vehicle, the combination of a plurality of motors, traction-wheels, variable-speed transmission-gearings driven by the motors respectively, gear-shifting elements for controlling said gearings respectively, and means operable by fluid under pressure from control stations at either end of the car and for conjointly or individually shifting the corresponding shifting elements for the gearings respectively.

8. In a motor propelled vehicle, the combination of a plurality of motors, traction-wheels, variable-speed transmission gearings driven by said motors respectively, gear-shifting elements for controlling said gearings respectively, and electro-magnetic means operable from a control station at either end of the car for conjointly or individually controlling the corresponding shifting elements of the gearings respectively.

9. In a motor propelled vehicle, the combination of a plurality of motors, traction-wheels, variable-speed transmission gearings driven by the motors respectively, gear-shifting elements for controlling said gearings respectively, means operable by fluid under pressure from control stations at either end of the car for conjointly or individually shifting the corresponding shifting elements of the gearings respectively, and electro-magnetic means for controlling the shifting means from the control stations.

10. In a motor propelled vehicle, the combination of a motor, traction-wheels, variable-speed transmission gearing for driving said wheels from the motor, reversible gearing associated with the traction-wheels, means operable by fluid under pressure for shifting said reverse gearing, and means for controlling the shifting means from control stations at either end of the vehicle.

11. The combination with a vehicle having a control station at one end thereof, of a plurality of motors, traction wheels, mechanism for driving the traction wheels from the motors comprising variable speed transmission gearings driven by said motors respectively, and means for controlling the gearings from said control station whereby they may be conjointly or individually operated.

12. The combination with a vehicle having a control station at each end thereof, of a plurality of motors, traction wheels, mechanism for driving the traction wheels from the motors comprising variable speed transmission gearings driven by the motors respectively, and means for controlling said gearings from each control station whereby the gearings may be conjointly or individually operated.

13. The combination with a vehicle having a control station at each end thereof, of a plurality of motors, traction wheels, mechanism for driving the traction wheels from the motors comprising clutches, and means for controlling said clutches from each control station whereby they may be conjointly or individually operated.

14. The combination with a vehicle having a control station at one end thereof, of a plurality of motors, traction wheels, mechanism for driving the traction wheels from the motors comprising a variable speed transmission gearing and a clutch for each motor, and means for controlling the transmission gearings and clutches from the control station whereby the gearings and clutches may be operated conjointly or the gearing and clutch for each motor may be individually operated.

15. The combination with a vehicle having a control station at one end thereof, of a plurality of motors, traction wheels, mechanism for driving the traction wheels from the motors comprising variable speed transmission gearings driven by said motors respectively, controlling mechanism for said gearings comprising gear-shifting elements for the gearings respectively, and means operable from the control station for rendering inoperative the gear-shifting elements for either gearings.

16. The combination with a vehicle having a control station at one end thereof, of a plurality of motors, traction wheels, mechanism for driving the traction wheels from the motors comprising variable speed transmission gearings driven by the motors respectively, controlling mechanism for said gearings comprising gear-shifting elements for said gearings respectively, and means for controlling said elements from the control station whereby the corresponding elements for the gearings may be conjointly or individually operated.

17. The combination with a vehicle having a control station at one end thereof, of a plurality of motors, traction wheels, mechanism for driving the traction wheels from the motors comprising variable speed transmission gearings between the motors and wheels and driven by the motors respectively, and means for controlling the gearings comprising a shifting mechanism for each gearing, a fluid pressure device for operating each mechanism, and means for controlling the devices from said station whereby they may be conjointly or individually operated.

18. The combination with a vehicle having a control station at each end thereof, of a plurality of motors, traction wheels, mechanism for driving the traction wheels from the motors comprising variable speed transmission gearings between the motors and wheels and driven by the motors respectively, and means for controlling the gearings comprising a shifting mechanism for each gearing, a fluid pressure device for operating each mechanism, and means for controlling said devices from each control station whereby they may be conjointly or individually operated.

19. The combination with a vehicle having a control station at one end thereof, of a plurality of motors, traction wheels, mechanism for driving the traction wheels from the motors comprising variable speed transmission gearings driven by said motors respectively, gear shifting elements for each gearing, electromagnets for selectively controlling the operation of the elements respectively, and means at said control station whereby the magnets for the corresponding elements of the gearings may be rendered conjointly or individually operable.

20. The combination with a vehicle having a control station at each end thereof, of a plurality of motors, traction wheels, mechanism for driving the traction wheels from the motors comprising variable speed transmission gearings driven by said motors respectively, gear shifting elements for each gearing, electromagnets for selectively controlling the operation of the elements respectively, and means at each control station whereby the magnets for the corresponding elements of the gearings may be rendered conjointly or individually operable.

Signed at Chicago, in the county of Cook and State of Illinois, this 5th day of January, 1923.

LEE W. MELCHER.